Figure 1:
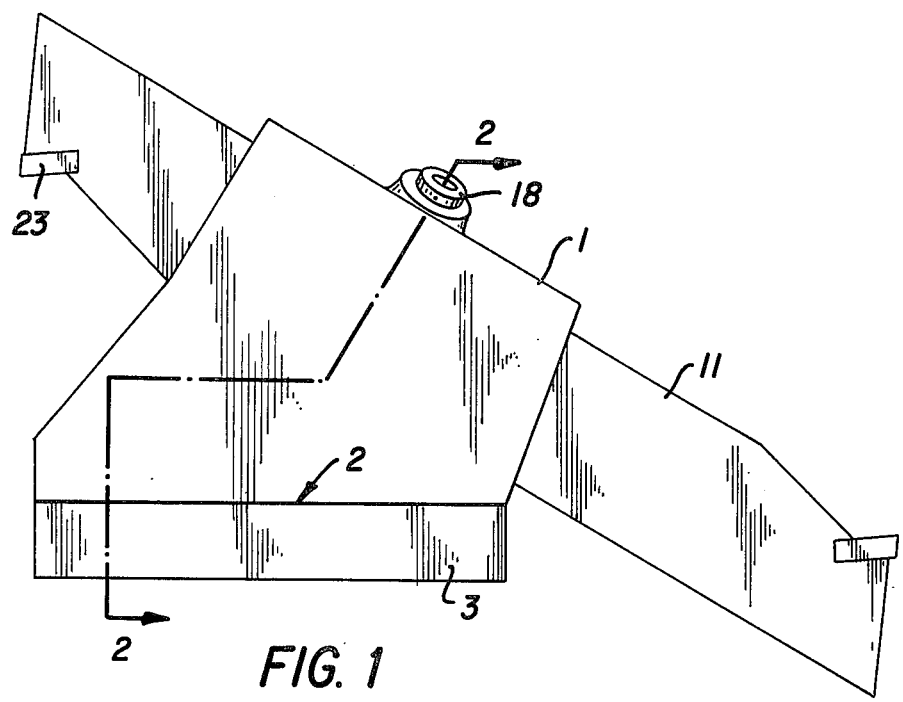

United States Patent [19]

Treloar

[11] Patent Number: 4,471,675
[45] Date of Patent: Sep. 18, 1984

[54] TOOL HOLDER

[76] Inventor: Howard A. Treloar, 28 Barretts Rd., Lynton, Australia, 5062

[21] Appl. No.: 511,267

[22] Filed: Jul. 6, 1983

Related U.S. Application Data

[63] Continuation of Ser. No. 220,050, Dec. 23, 1980, abandoned.

[30] Foreign Application Priority Data

Apr. 23, 1979 [AU] Australia .................. PD8507/79

[51] Int. Cl.³ ........................................ B23B 29/00
[52] U.S. Cl. ................................ 825/36 R; 407/117; 407/108
[58] Field of Search ............... 82/36 R, 36 A, 36 B, 82/35, 37; 407/117, 108, 67, 76, 79, 80, 120, 102; 408/76, 88, 101

[56] References Cited

U.S. PATENT DOCUMENTS

| | | | |
|---|---|---|---|
| 1,266,116 | 5/1918 | Gibbs | 82/36 R |
| 2,188,917 | 2/1940 | Poorman | 82/36 R |
| 2,243,239 | 5/1941 | Zasada | 407/117 |
| 2,453,959 | 11/1948 | Anthony et al. | 407/117 |
| 2,541,719 | 2/1951 | Proksa | 407/80 |
| 2,875,662 | 3/1959 | Poorman | 82/36 R |
| 3,026,752 | 3/1962 | Zabel | 82/12 |
| 3,603,185 | 9/1971 | Curry | 82/36 R |
| 3,815,454 | 4/1973 | Knott | 407/117 |
| 4,043,012 | 8/1973 | Rowlson et al. | 407/45 |
| 4,051,584 | 10/1977 | Huser | 407/117 |

FOREIGN PATENT DOCUMENTS

| | | | |
|---|---|---|---|
| WO80/02244 | 10/1980 | PCT Int'l. Appl. | 82/36 R |
| 542712 | 1/1942 | United Kingdom | 407/117 |
| 837592 | 6/1960 | United Kingdom | 82/36 R |

Primary Examiner—Leonidas Vlachos
Assistant Examiner—Jerry Kearns
Attorney, Agent, or Firm—Oldham, Oldham, Hudak, Weber & Sand Co.

[57] ABSTRACT

A toolholder for a lathe tool has a detachable base plate designed to be clamped on a lathe. A blade holder is connected to the base plate by screws or a combination of screws and pins. The base plate is indexible through 180 degrees to project in "L" configuration from either side of the blade holder. An aperture is provided in the blade holder to receive a cutting blade. A clamping plate with a serrated face is pressed against the blade by engagement of a set screw with an inclined face at the top of the clamp plate.

6 Claims, 6 Drawing Figures

U.S. Patent  Sep. 18, 1984  Sheet 1 of 2  4,471,675

TOOL HOLDER

This is a continuation application of Ser. No. 220,050, filed Dec. 23, 1980, now abandoned.

Tool holders of many forms are already known, among which are holders which have a portion which is adapted to be held to the lathe and which is apertured to take a cutting blade which is held in the holder by grub screws or similar members pressing either against the tool or against a clamping plate.

It is known to have an upright portion with an extending foot portion whereby it can be clamped to the appropriate part of a lathe, see for instance Australian Registered Design No. 77,675 granted to me the said HOWARD ARCHIBLAD TRELOAR as of the nineteenth day of September 1979.

It is known to use a serrated clamping plate to hold the blade to the tool.

It is known to hold a blade at an angle to the tool.

In the case of a tool which has an extending foot portion it is generally necessary to have these in left and right form depending on the tool and position of the cut so that at least a plurality of holders is necessary to enable the various tool positions to be achieved.

An object of the present invention is to provide a universal tool holder which can be used both for right-hand and left-hand operation.

A further object is to provide an effective method of locking the blade in the holder in various extensions.

A still further object is to provide an effective combination of holder, blade and clamping plate.

The device according to the present invention comprises a blade holder which has through it, preferably at an inclined angle, a slot in which a blade and a clamping plate can be positioned and locked to hold the cutting blade firmly in relation to the holder, the blade holder however having removably secured to it a base plate which is so arranged that it can project either on the left side or the right side of the blade holder to ensure that the tool can be universally used.

The invention thus consists of a tool holder comprising a blade holder having a base plate projecting from one face of the blade holder and including an aperture in the blade holder to receive a blade and having in the aperture a clamping plate, characterised in that the base is separate from the blade holder and is arranged to be positioned to project either from one side of the blade holder or from the other side thereof, and by means to lock the base plate to the blade holder selectively in any one of two oppositely facing positions.

Figure 2:
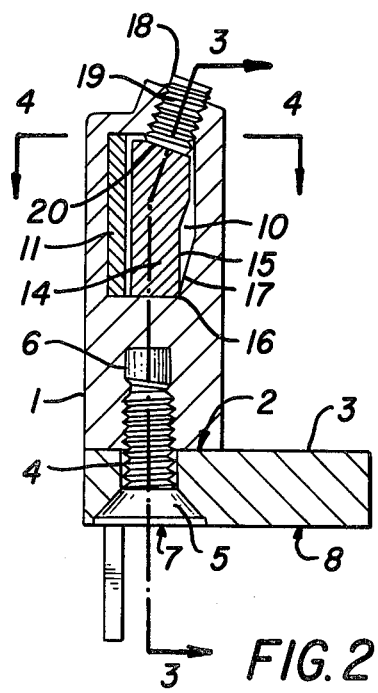
Figure 5:
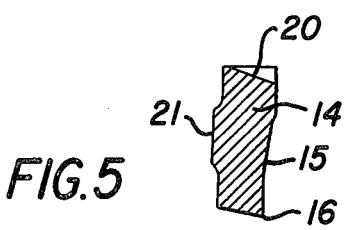
Figure 6:
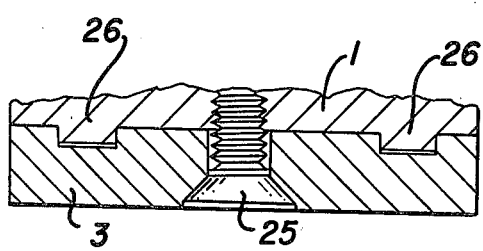
Figure 3:
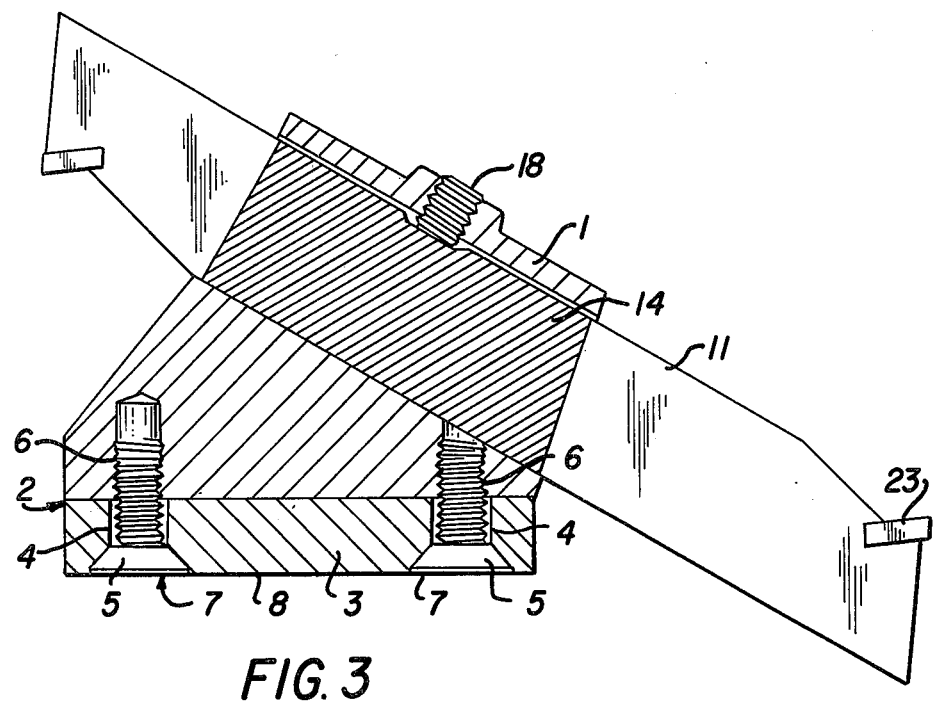
Figure 4:
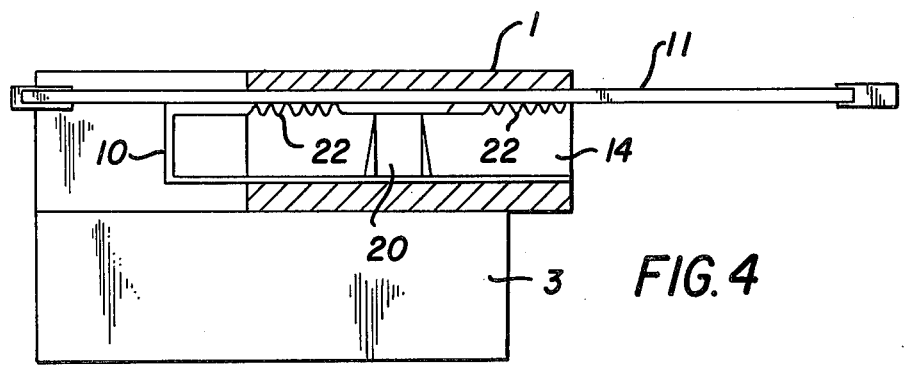

In order however that the invention will be fully understood, an embodiment thereof will now be described with reference to the accompanying drawings in which:

FIG. 1 is a side elevation of a tool and holder according to this invention,

FIG. 2 is a transverse section on line 2—2 of FIG. 1 showing the clamping plate and one of the screws holding the blade holder to the base plate, FIG. 3 is a view similar to FIG. 1, but sectioned longitudinally on line 3—3 of FIG. 2, FIG. 4 is a sectional plan view taken on line 4—4 of FIG. 2, and FIGS. 5 and 6 show constructional variations.

The blade holder 1 has a face 2 which is arranged to engage a base plate 3, the base plate 3 having apertures 4—4 to allow locking screws 5—5 to pass therethrough and the blade holder having threaded apertures 6—6 corresponding to the apertures 5—5 in the base plate so that the screws 5—5 can be passed through the apertures 4—4 in the base plate 3 to engage the threaded apertures 6—6 in the blade holder to lock the base plate 3 and blade holder 1 firmly together.

Each screw 5 is of the countersunk type so that its outer face surface is flush or recessed in relation to the bottom 8 of the base plate 3 which is to be attached to the lathe saddle or turret, and the apertures 7—7 in the base plate 3 are disposed near one edge of the base plate so that the base plate can either project on one side or the other side of the blade holder 1 when held in place on the blade holder 1 by the locking screws 5—5.

The blade holder 1 has through it an aperture 10 which is shaped to have one wall defining the aperture of a shape to engage the blade 11 and to be firmly located in that part of the blade holder 1, but adjacent to the blade holder is a clamping plate 14 which fits into the aperture 10 but which has a face 15 which engages the edge 16 of an incline 17 in the aperture 10 so that it can be tilted toward or away from the blade 11, and this clamping plate 14 is held in position by means of a locking screw 18 which can be in the nature of a grub screw as shown and is positioned in a threaded aperture 19 in the blade holder and engaging an inclined face 20 at the top of the clamping plate, the incline being so arranged that pressure against it is not in the direction parallel to the face of the clamping plate 14 but inclined thereto so that pressure of the locking screw 18 tilts the clamping plate 14 towards the blade 11 about the lower edge 16 of the clamping plate 14, the downward force on the clamping screw 18 also forcing the edge 16 of the clamping plate 14 against the inclined portion 17 of the wall of the aperture 10 at the base of the aperture to provide the required lock of the clamping plate 14 onto the blade 11.

The actual form of a clamping plate 14 can be varied and it can for instance have its centre part 21 protruding to press against the blade to force it against the wall of the aperture as shown in FIG. 5, but preferably has teeth 22 formed on it which are arranged in two sections near the ends of the blade as shown particularly in FIG. 4 so that these engage remote areas of the blade, one nearer the cutting edge 23 of the blade and the other more remotely in relation to the cutting edge, this clamping plate being forced into position by the locking screw 18 centrally disposed in the blade holder 1 in relation to the clamping plate 14.

The blade holder has its lower edge shaped so that as it is forced down the part 16 of the edge remote from the blade 11 is forced down against the inclined surface 17 formed in the aperture 10.

Instead of using two screws 5—5 it is possible to use a single screw 25 as shown in FIG. 6 and to have two register pins 26—26 on the blade holder 1 engaging a pair of sockets 27—27 in the base plate 3, or other similar register means can be used to allow the base plate 3 to project on either side of the blade holder 1.

From the foregoing it will be realised that the tool holder consists of two parts, one being a blade holder which is apertured to hold the blade and the clamping plate, and the other is a base plate which is so arranged that it can be removed from the blade holder and repositioned to allow the blade holder to be used for instance with left and right projection. The blade holder can thus be turned through 180° in relation to the base plate.

I claim:

1. A tool holder comprising as separate integers an elongated blade holder and a base plate separate therefrom but attachable thereto, said blade holder having a downwardly sloping aperture through the elongated dimension of the blade holder to receive a blade and hold it at an angle inclined downward from a forward end of said blade holder and the cutting edge of the said blade, said aperture being defined on one side by a face adapted to have the said tool pressed against it and on the opposite side by a lower face sloping toward the first said face, a clamping plate in the said aperture adapted to engage the side of the said blade, and, projecting into the said aperture above the said clamping plate to engage the said clamping plate, a screw engaged in a threaded aperture in the said blade holder and inclined to engage the said clamping plate and urge it toward the said tool, the said base plate being arranged to be positioned beneath the said blade holder and turned to project either from a first elongated side of the said blade holder or from a second elongated side thereof, opposite the said first side when the said base plate is turned through 180° in relation to the said tool holder about an axis through the said base plate and tool holder near one edge of said base plate, and means to lock the said base plate to the said blade holder selectively in any one of the said two oppositely facing positions, the said blade holder being locked to the said base plate by at least one locking screw, said base plate having an aperture through it to receive the screw and engage a head on the said screw, said blade holder having a screw-threaded aperture to engage the said screw and interengaging register means on each of the said screw on at least one side of the said screw, whereby to lock the said base plate to the said blade holder in any one of the two said oppositely directed positions.

2. A tool holder comprising as separate integers an elongated blade holder and a base plate separate therefrom but attachable thereto, said blade holder having an aperture through the elongated dimension of the blade holder and sloping downwardly towards a forward end of the blade holder, to recieve a blade and hold it at an angle inclined downward from the cutting end of the said blade, said aperture being defined on one side by a face adapted to have the said tool pressed against it and on the opposite side by a lower face sloping toward the first said face, a clamping plate in the said aperture adapted to engage the side of the said blade, and projecting into the said aperture above the said clamping plate to engage the said clamping plate a screw engaged in a threaded aperture in the said blade holder and inclined to urge the said clamping plate toward the said tool, the said base plate being arranged to be positioned beneath the said blade holder and turned to project either from a first elongated side of the said blade holder or from a second elongated side thereof, opposite the said first side base plate and tool holder about an axis through the said base plate and tool holder near one edge of the said base plate and means to lock the said base plate to the said blade holder selectively in any one of the said two oppositely facing positions, the said blade holder being locked to the said base plate by a pair of locking screws, said blade holder having a pair of screw-threaded apertures to engage the said screws, whereby to lock the said base plate to the said holder in any one of the two said oppositely directed positions.

3. A tool holder comprising as separate integers an elongated blade holder and a base plate separate therefrom but attachable thereto, an aperture through the elongated dimension of the said blade holder sloping downwardly to receive a blade and hold it at an angle inclined downwardly from the cutting end of the said blade, said aperture being defined on one side by a face adapted to have the said tool pressed against it and on the opposite side by a face having its lower part sloping toward the first said face, a clamping plate in the said aperture adapted one side to engage the said blade and at the lower edge of the other side the said sloping face, a screw projecting into the said aperture above the said clamping plate, a threaded aperture in the said blade holder to engage the said screw, said aperture and screw being inclined to urge the said clamping plate toward the said tool, the said base plate being arranged to be positioned beneath the said blade holder and turned to project either from a first elongated side of the said blade holder or from a second elongated side thereof, opposite the said first side when the said base plate is turned through 180° in relation to the said tool holder about the axis through the said base plate and tool holder near one edge of the said base plate, and means to lock the said base plate to the said blade holder selectively in any one of the said two oppositely facing positions, the said locking means comprising a screw, said base plate having an aperture through it to receive the said screw and engage a head on the said screw, said blade holder having a screw-threaded aperture to engage the said screw, and interengaging register means on each of the said blade holder and the said base plate remote from the said screw on at least one side of the said screw, whereby to lock the said base plate to the said blade holder in any one of the two said oppositely directed positions.

4. A tool holder comprising as separate integers an elongated blade holder and a base plate separate therefrom but attachable thereto, an aperture through the elongated dimension of the said blade holder sloping downward from a first end to receive a blade and hold it at an angle inclined downward from the cutting end of the said blade, said aperture being defined on one side by a face adapted to have the said tool pressed against it and on the opposite side by a face having its lower part sloping toward the first said face, a clamping plate in the said aperture adapted on one side to engage the said blade and at the lower edge of the other side the said sloping face, a screw projecting into the said aperture above the said clamping plate, a threaded aperture in the said blade holder to engage the said screw, said aperture being inclined to urge the said clamping plate toward the said tool, the said base plate being arranged to be positioned beneath the said blade holder and turned to project either from a first elongated side of the blade holder or from a second elongated side thereof, opposite the said first side when the said base plate is turned around 180° in relation to the said tool holder about the axis through the said base plate and tool holder near one edge of the said base plate, and means to lock the said base plate to the said blade holder selectively in any one of the said two oppositely facing positions, the said blade holder being locked to the said base plate by a pair of locking screws, said blade holder having a pair of screw-threaded apertures to engage the said screws, whereby to lock the said base plate to the said blade holder in any one of the two said oppositely directed positions.

5. A tool holder according to claim 3 or 4 characterised by a central protrusion on the said clamping plate positioned to press against the side of said blade.

6. A tool holder according to claim 3 or 4 characterised by two series of teeth arranged on the said clamping plate to engage longitudinally spaced parts of said blade, one set on each side of an intermediate recessed inclined face engageable by said locking screw.

* * * * *